Oct. 22, 1968  G. P. JENNINGS  3,406,986
CONDUIT COUPLING
Filed June 16, 1967

INVENTOR.
G. P. JENNINGS
BY Young & Quigg
ATTORNEYS

United States Patent Office
3,406,986
Patented Oct. 22, 1968

3,406,986
CONDUIT COUPLING
Gerald P. Jennings, Bartlesville, Okla., assignor to Phillips Petroleum Company, a corporation of Delaware
Filed June 16, 1967, Ser. No. 646,510
2 Claims. (Cl. 285—21)

ABSTRACT OF THE DISCLOSURE

Conduits are coupled and sealed together by coupling devices having an inner section adapted to fit over the ends of two adjacent conduits, and two end sections spaced from the ends of the inner section by packing material, and an outer section enclosing the inner section, the packing material, and at least portions of the end sections. The seal is effected by drawing the end sections together with an adjustable clamping device, for example.

This invention relates to conduit coupling. In another aspect, this invention relates to the repair of fluid conduits.

Frequently, fluid pipe lines such as pipe lines carrying inflammable material such as gasoline and oil develop leaks and must be rapidly repaired to prevent loss of the fluid contained therein and fire hazards from developing. Smaller leaks are normally repaired by various methods known in the art without the necessity of cutting off the flow of the fluid therethrough. However, when larger sections of pipelines develop leaks the repair thereof sometimes becomes more difficult. In these situations, it is sometimes necessary to remove the leaky section and replace it with a new section of pipe. This, of course, requires that the fluid flow through the pipeline be shut off during the repair operation. Thus, when replacing these leaky sections it is desirable not only to have a minimum pipeline shutdown time but also to avoid the use of sparks and flames such as produced by welding because of the inflammable nature of the leaked material surrounding the pipeline adjacent the leaky section.

Therefore, one object of this invention is to provide a novel method of rapidly joining conduits in a sealing relationship.

Another object of this invention is to provide an improved apparatus for rapidly coupling conduits in sealing engagement.

A further object of this invention is to provide a method and apparatus for rapidly and effectively repairing a leaky section of a pipeline which has deposited relatively large quantities of inflammable material thereabout.

According to one embodiment of this invention, a novel coupling device is provided for joining and sealing conduits comprising an inner section adapted to fit over the ends of two axially aligned conduits, two sealing elements abutting either end of the inner section, first and second end sections abutting the two sealing elements respectively, an outer section positioned over the inner section, the two sealing elements, and at least portions of the first and second end sections and means such as adjustable clamps for drawing the first and second end sections together.

According to another embodiment of this invention, the above sections and elements are positioned over one or both of the conduit ends to be joined in a sequence so that the sections and elements can be slidably mounted over the conduit junction as the conduits are brought into alignment. After the conduits are brought into alignment and the sections and elements are put in place over the resulting conduit junction, the first and second end sections are pressed together by a suitable means such as the said adjustable clamp to compress the sealing elements against the periphery of the respective conduits. If desired, the ends of the outer section are welded to the first and second end sections and the outer ends of the first and second end sections are welded to their respective conduits. This method is particularly useful when repairing leaky conduits containing inflammable material whereby the conduit seal can be rapidly effected and the coupling device can be later welded to the pipeline while in sealing engagement after any leaked inflammable material has evaporated to the atmosphere or soaked into the surrounding soil.

This invention can be understood more easily from the study of the drawings in which.

When a pipeline, particularly a pipeline carrying inflammable materials, develops a leaky section that cannot be repaired by simple patches or boots, etc., it is generally necessary to shut off the fluid flow through the pipeline, cut the leaky section from the pipeline by suitable means such as pipe cutters or saws and seal a repair section therein. As previously stated, rather large amounts of inflammable material are usually deposited around the leaky section and it is highly inadvisable to use welding equipment to initially attach and seal the repair section within the pipeline. This invention provides an apparatus and a method which can be used to safely and effectively seal a repair section in a pipeline.

Figure 1:
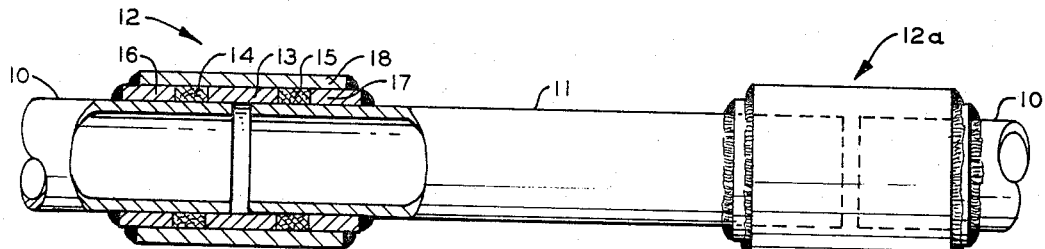
FIGURE 1 is an illustration partly in section of a conduit which has been permanently repaired with the apparatus of this invention.

FIGURE 1 is an illustration of a conduit 10 which has had a leaky section cut out and a repair section 11 inserted therein by the method and apparatus of this invention. Coupling devices 12 and 12a sealably connect repair section 11 in conduit 10.

Figure 2:
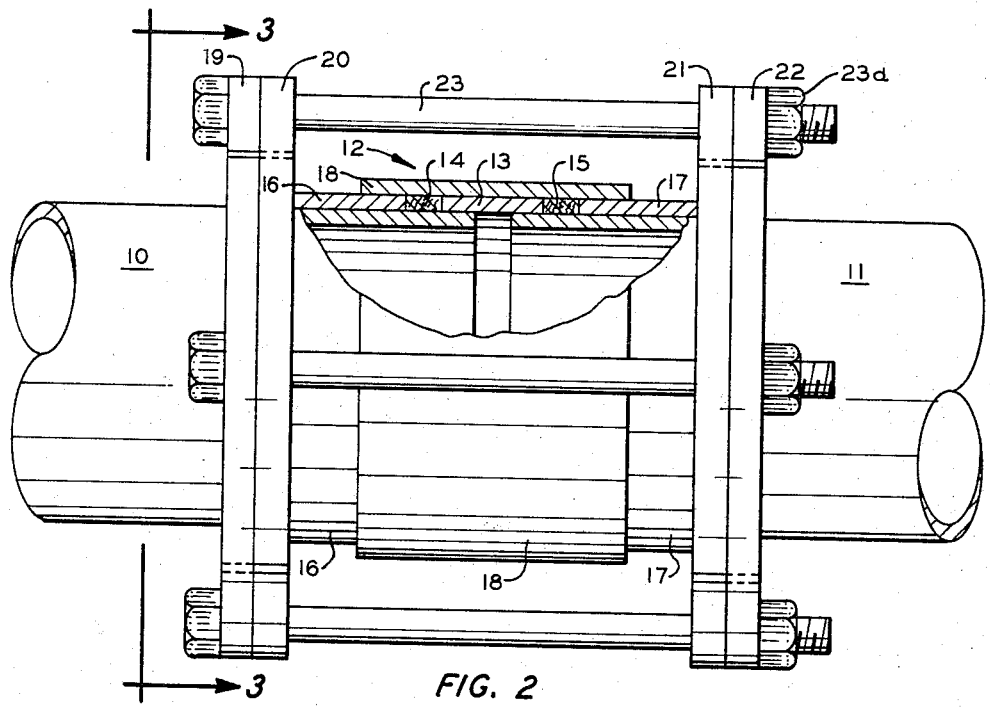
FIGURE 2 is an illustration partly in section of a sealing apparatus of this invention.

FIGURES 1 and 2 illustrate a preferred coupling device of this invention. As illustrated in FIGURES 1 and 2, coupling device 12 comprises an inner cylindrical section 13 adapted to fit over one end of conduit 10 and one end of repair conduit 11; sealing elements 14 and 15 abutting either end of section 13; cylindrical section ends 16 and 17 abutting sealing elements 14 and 15 respectively; and outer cylindrical section 18. These sections and elements can be installed by positioning them over either or both ends of conduits 10 and 11 in the proper sequence, aligning conduits 10 and 11 adjacent one another and sliding the sections and elements in place. When inserting a repair section in a conduit as illustrated in FIGURE 1, two sets of sealing elements respectively can be positioned on either end of the repair section and/or two exposed ends of the pipeline adjacent the removed leaky section, the repair section can then be aligned with the conduit and the sections and elements slipped into place as described above. It is noted that sealing elements 14 and 15 can be either circular packing rings or strands of packing material placed around the respective conduits and between respective cylindrical sections in a manner well known in the art such as by angle cutting the ends of a strip of such material, wrapping the strip around the conduit, and fitting the angle-cut ends together. Any suitable packing material can be used such as a woven asbestos impregnated with graphite.

After the said sections and elements are slipped in place over the conduit junction, circular flanges 19 and 20 are placed over conduit 10 and adjacent the outer end of cylindrical section 16 and circular flanges 21 and 22 are placed over conduit 11 and against the outer edge of cylindrical section 17. Bolts 23 connect the flanges as illustrated in FIGURE 2.

Figure 3:
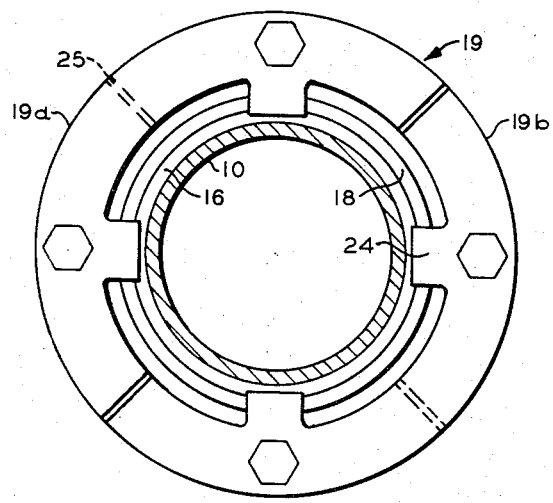
FIGURE 3 is a sectional view along lines 3—3 of FIGURE 2.

FIGURE 3 is a sectional view along lines 3—3 of FIGURE 2 illustrating the placement of the flanges. As shown, flange 19 comprises semi-circular flange sections 19a and 19b having lugs 24 extending inwardly therefrom. Flange 20 (FIGURE 2) is the same as flange 19 except that its corresponding flange sections are offset 90° from the flange sections of flange 19 as illustrated by characters 25 (the dotted lines of FIGURE 3). It is noted that flanges 19 and 20 need not be split 90° apart but merely need to be offset in a non-aligned position as each pair of flanges is brought together by bolts 23. Flange 20 also has lugs 24 extending inwardly therefrom which are in contact with the outer edge of cylindrical section 16. At least two lugs 24 are necessary; however, it is preferred to use a lug corresponding to each bolt 23. Flanges 21 and 22 are similar to flanges 19 and 20. Flanges 19, 20, 21 and 22 can be assembled on conduits 10 and 11 by placing the semi-circular flange sections around a respective conduit and running bolts 23 therethrough as illustrated in FIGURES 2 and 3.

After coupling device 12 is mounted over the junction of conduits 10 and 11 and flanges 19, 20, 21, and 22 are mounted on conduits 10 and 11 and connected by bolts 23 (FIGURE 2), nuts 23a are tightened. This action draws cylindrical end sections 16 and 17 together thereby compressing sealing elements 14 and 15 between cylindrical sections 16, 13 and 17 in one direction and between cylindrical section 18 and conduits 10 and 11 in another direction. This latter action effectively seals conduits 10 and 11 together. This method therefore results in a very rapid and effective repair of a leaky conduit, for example. A more permanent coupling and seal can be effected by welding the outer edges of cylindrical section 18 to cylindrical sections 16 and 17 respectively, and welding the outer edges of cylindrical sections 16 and 17 to the periphery of conduits 10 and 11 respectively as illustrated in FIGURE 1. This welding can be done immediately after the seal is effected with the adjustable flanges or at a later time, for example, after any leaked inflammable material has evaporated into the atmosphere or soaked into the soil. Normally, it is desirable to initially spot weld cylindrical sections 16 and 17 to conduits 10 and 11 respectively at points between lugs 24 (FIGURE 3). The flanges can then be removed while the spot weld holds the sections and elements in sealing engagement. After the flanges are removed the welding can be completed.

It must be noted that various adjustable clamping means can be used instead of the flanges illustrated in FIGURES 2 and 3; however, the use of these flanges is preferred because of their easy installation and removal. Also, conduits having different sized diameters can be coupled by this invention. For example, if conduit 11 has a larger diameter than conduit 10, then cylindrical section 13 can comprise an annular body, one-half of which is sized to fit over conduit 10 and one-half of which is sized to fit over conduit 11. Corresponding sizes of cylindrical sections 16, 17, and 18, and the sealing elements 14 and 15 can then be used. Also, if desired, cylindrical section 13 can be attached to the inside diameter of cylindrical section 18 to form a one-piece section having an annular constriction around the middle therein.

From the foregoing, it is apparent that the specific embodiments described herein are in no way intended to limit the scope of this invention, and that one skilled in the art, upon reading this disclosure, can make various modifications thereof without departing from the scope of this invention.

I claim:
1. Apparatus for connecting conduits comprising in combination:
 (a) an inner tubular section adapted to fit over the aligned ends of two conduits;
 (b) first and second seals abutting each end respectively of said inner section;
 (c) first and second tubular end sections abutting said first and second seals respectively;
 (d) an outer tubular section adapted to fit over said inner section, said first and second seals, and at least portions of said first and second end sections respectively;
 (e) an adjustable clamping means for drawing said first and second end sections against said first and second sealing sections respectively comprising:
  (1) two pairs of flanges having inside diameters greater than the outer diameter of said end sections, each said pair of flanges comprising an inner split annular flange and an outer split annular flange, each split flange being formed by two removable flange segments; each inner flange segment having at least two lugs extending inwardly from the inner diameter of each flange segment in a radial plane, the diameter between the inner edges of the lugs being slightly greater than the external diameter of said aligned conduits, each lug of each split flange segment extending in a circumferential direction substantially less than the circumferential portion of each flange segment, thereby forming welding spaces between said lugs, and an outer annular split flange having its split offset from the split of the first annular split flange to also form two removable segments;
  (2) adjustable connecting bolt means passing through registering apertures in each pair of said flanges for connecting each pair of said flanges and adapted to draw each pair of said flanges together, said apertures positioned through each pair of flanges at points intermediate the points where each said inner annular split flange and outer annular split flange is divided.

2. The apparatus of claim 1, wherein said inner section, said first end section, and said second end section have equal outside and inside diameters, the said inside diameters being slightly larger than the outside diameter of said two conduits and said outer section has an inside diameter slightly larger than the outside diameters of said inner section and said first and second end sections.

References Cited

UNITED STATES PATENTS

| 2,009,650 | 7/1935 | Claussen et al. | 285—368 |
| 2,651,329 | 9/1953 | Fowler | 285—368 |
| 2,747,900 | 5/1956 | Smith | 285—286 |

FOREIGN PATENTS

| 1,225,021 | 6/1960 | France. |
| 1,422,364 | 11/1965 | France. |
| 249,671 | 8/1926 | Italy. |

CARL W. TOMLIN, *Primary Examiner.*

W. L. SHEDD, *Assistant Examiner.*